Patented Mar. 31, 1931

1,798,588

UNITED STATES PATENT OFFICE

ADRIEN CAMBRON, OF TOTTENVILLE, NEW YORK, ASSIGNOR, BY MESNE ASSIGNMENTS, TO THE ROESSLER & HASSLACHER CHEMICAL COMPANY, A CORPORATION OF DELAWARE

PROCESS FOR THE PREPARATION OF TETRA-METHYL-THIURAM POLYSULPHIDES

No Drawing.     Application filed May 28, 1926.  Serial No. 112,403.

The object of this invention is an improvement in the manufacture of tetra methyl thiuram polysulphides so that their commercial production may be at a lower cost than heretofore possible.

I have found that polysulphides having as their main radical that of the dimethyl dithiocarbamic acid can be prepared by a series of reactions starting from the simplest of compounds and without the isolation of any of the intermediate products. I have further found that the whole series of operations can be carried out in an aqueous medium thus eliminating expensive solvents.

My process carries the materials in solution through three stages as follows:

1. Preparation of dimethyl ammonium chloride.
2. Conversion to sodium dimethyl dithiocarbamate.
3. Conversion to the tetramethyl thiuram polysulphide.

These steps are in general carried out as follows:

1. Dimethyl ammonium chloride is prepared by heating an aqueous solution of ammonium chloride with formaldehyde for several hours; the formaldehyde used is added in two successive portions and is preferably in the form of a mixture of paraform and aqueous formaldehyde solution. The solution from this reaction is concentrated and most of the unreacted ammonium chloride crystallized out and some by-products recovered.

2. An equivalent amount of carbon bisulphide is now added to the concentrated solution of dimethyl ammonium chloride and a saturated aqueous solution of sodium hydroxide or any other inorganic base stronger than dimethyl amine, added till the mixture is alkaline.

3. The polysulphides desired are now prepared from the above solution. The tetra methyl thiuram disulphide is prepared by treating the solution with an oxidizing agent such as chlorine; the trisulphide is prepared by treating the solution from 2 with sulphur dichloride while treatment with sulphur monochloride will give the tetra sulphide. The preparation of these polysulphides then consists in treating the solution from 2 with $S_xCl_2$ wherein "$x$" represents any number less than 3, including "0". If "$x$" is "0" then $S_xCl_2$ becomes $Cl_2$ and the disulphide is the product; if "$x$" is "1" or "2" then $S_xCl_2$ becomes $SCl_2$ or $S_2Cl_2$ and the trisulphide or tetrasulphide are respectively formed.

My invention accordingly comprises a unit process for the manufacture of the tetra methyl thiuram polysulphides. In this way in one continuous process, with no isolation of intermediates, the overall yield is increased, difficult and time consuming separations are avoided, and the use of expensive solvents has been avoided since I have discovered that in employing my unit process water solutions can be used throughout.

Throughout the specification and in the claims I refer to specific sulphur chlorides as sulphur monochloride and sulphur dichloride having formulæ respectively of $S_2Cl_2$ and $SCl_2$. However, I do not wish to be limited to these formulæ since the structure of the compounds is somewhat in doubt. Furthermore, sulphur is very soluble in these sulphur chlorides and may be present in molecules of a polysulphide nature having several loosely bound sulphur atoms in addition to those ascribed to them by their formulæ. I therefore express these sulphur chlorides in my reactions as $S_xCl_2$ wherein "$x$" represents any number which in the preferred embodiments of my invention is limited as noted above; it is understood, however, that if sulphur be dissolved in the reagent "$x$" may be greater than 2.

The chief reactions taking place in my process are as follows:

1. $NH_4Cl + 3HCHO \rightarrow (CH_3)_2NH \cdot HCl + H_2O + CO_2$
2. $(CH_3)_2NH \cdot HCl + CS_2 + 2NaOH \rightarrow$

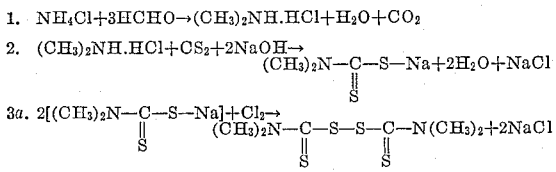

or

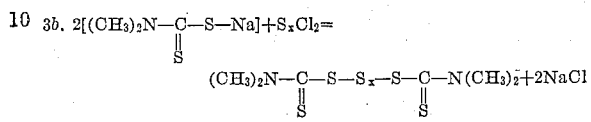

In 3a "$x$" in $S_xCl_2$ is "0" whereas reaction 3b is given to show the cases wherein "$x$" is a finite number.

Thus if $SCl_2$ is used in reaction 3b the trisulphide will be formed whereas with $S_2Cl_2$ the tetrasulphide would be formed. A sulphur chloride of a polysulphide nature would give higher polysulphide products.

As an illustration of my process of manufacture the following example is given.

A mixture of 0.625 pound 37% aqueous formaldehyde solution, 0.140 pound paraform and 0.5 pound ammonium chloride was heated for four hours at 105–110° C. This reaction mixture was then cooled to 90° C. and 0.3 pound of 37% aqueous formaldehyde solution and 0.169 pound paraform were added. The mixture was now heated to 115–120° C. and kept at this temperature for four hours.

The vapors from these reaction mixtures were condensed and collected. The condensate consisted of an aqueous solution of methyl alcohol, methyl formate, methylal and formic acid. The formic acid was recovered from this distillate by conversion to sodium formate with sodium hydroxide, and then distilling off the remaining components of the mixture; 0.3 pound of sodium formate, 0.04 pound methylal and 0.07 pound methyl alcohol were recovered.

The solution, weight about 1.2 pound, was then evaporated at 100° C. to a weight of about 0.85 pound and finally cooled. 0.12 pound of unreacted ammonium chloride was recovered by filtering the cool solution. The filtrate now consisted chiefly of dimethyl ammonium chloride with small amounts of methyl ammonium chloride and ammonium chloride. 0.430 pound of carbon bisulphide was now added to the cooled solution. 0.46 pound of sodium hydroxide in a concentrated (approximately 35%) aqueous solution was now stirred in slowly while cooling the reaction mixture so that its temperature did not rise to over 25° C. This reaction is preferably carried out in a closed system to prevent undue loss of the carbon bisulphide. The addition of the sodium hydroxide is regulated by the alkalinity of the solution and is stopped when the mixture shows a distinct but not permanent alkalinity with phenolphthalein paper. The sodium dimethyl dithiocarbamate content of the solution may be estimated by precipitating as the relatively insoluble zinc salt.

The aqueous solution was now well cooled and 0.430 pound sulphur monochloride ($S_2Cl_2$) slowly stirred in. The tetra methyl thiuram tetrasulphide precipitated as an amorphous powder which was filtered off and dried.

Claims:

1. A unit process for the preparation of tetra methyl thiuram polysulphides from formaldehyde, an ammonium salt, carbon bisulphide, sodium hydroxide and halogens or sulphur halides in a single solution which comprises reacting an aqueous solution of formaldehyde and excess ammonium chloride, removing a major portion of the unreacted ammonium chloride and side reaction products, reacting carbon bisulphide with the material in solution in the presence of sodium hydroxide, and forming the desired tetramethyl thiuram polyshulphide by treatment of the solution with an agent capable or removing the metal radical from, and causing the coupling of, two of the acid radicals of the dithiocarbamate in the aqueous solution.

2. Process of producing a tetra methyl thiuram polysulphide consisting in reacting an aqueous solution of ammonium chloride and formaldehyde, treating such solution to remove the major portion of unreacted ammonium chloride and by-products formed, treating the resulting solution with carbon bisulphide and an inorganic base to produce a metal salt of dimethyl dithiocarbamic acid in solution, and forming therefrom the desired tetra methyl thiuram polysulphide with an agent capable of removing the metal radical from, and causing the coupling of, two of the acid radicals of the dithiocarbamate in the aqueous solution.

3. Process of producing a tetra methyl thiuram polysulphide consisting in reacting an aqueous solution of ammonium chloride and formaldehyde, treating such solution to remove the major portion of unreacted ammonium chloride and by-products formed, treating the resulting solution with carbon bisulphide followed by an aqueous solution of an alkali metal hydroxide while cool to produce an alkali metal salt of dimethyl dithiocarbamic acid in solution, and forming therefrom a tetra methyl thiuram polysulphide by treatment with a sulphur chloride of the formula $S_xCl_2$ wherein "$x$" represents any finite number less than 3.

4. Process of producing a tetra methyl thiuram polysulphide consisting in reacting an aqueous solution of ammonium chloride and formaldehyde, treating such solution to remove the major portion of unreacted ammonium chloride and by-products formed, treating the resulting solution with carbon bisulphide followed by an aqueous solution of an alkali metal hydroxide while cool to produce an alkali metal salt of dimethyl dithiocarbamic acid in solution, and forming therefrom tetra methyl thiuram tetrasulphide by treating the solution with $S_2Cl_2$.

5. Process of making a tetra methyl thiuram polysulphide consisting in treating an aqueous solution of an alkali metal salt of dimethyl dithiocarbamic acid with a sulphur chloride of the formula $S_xCl_2$ wherein "$x$" represents any finite number less than 3.

6. Process of making a tetra alkyl thiuram polysulphide consisting in treating an aqueous solution of a dialkyl dithiocarbamate with a sulphur chloride of the formula $S_xCl_2$ wherein "$x$" represents any finite number less than 3.

7. Method of preparing a tetra alkyl thiuram polysulphide which consists in treating a dialkyl amine hydrochloride in aqueous solution with carbon bisulphide and an inorganic base to form a metal dialkyl dithiocarbamate in aqueous solution, and then treating with a chlorine containing agent acting to form a chloride with the metal radical of said dithiocarbamate and to precipitate the tetra alkyl thiuram polysulphide.

8. Method of preparing a tetra methyl thiuram polysulphide which consists in treating dimethyl amine hydrochloride in aqueous solution with carbon bisulphide and sodium hydroxide to form sodium dimethyl dithiocarbamate in aqueous solution, and then treating with a chlorine containing agent acting to form sodium chloride and to precipitate the tetra methyl thiuram polysulphide.

9. The step in the process of preparing a tetra methyl thiuram polysulphide which consists in reacting an aqueous solution of ammonium chloride and formaldehyde.

10. The step in the process of preparing a tetra alkyl thiuram polysulphide which consists in reacting a dialkyl amine hydrochloride in aqueous solution with carbon bisulphide and an inorganic base stronger than the dialkyl amine.

11. The step in the process of preparing a tetra methyl thiuram polysulphide which consists in reacting dimethyl amine hydrochloride in aqueous solution with carbon bisulphide and sodium hydroxide.

12. The process which comprises preparing an aqueous solution of dimethyl amine hydrochloride by reacting an aqueous solution of ammonium chloride and formaldehyde, removing a major portion of the unreacted ammonium chloride and then treating the aqueous solution with carbon bisulphide and an inorganic base stronger than dimethyl amine.

13. The process which comprises preparing an aqueous solution of dimethyl amine hydrochloride by reacting an aqueous solution of ammonium chloride and formaldehyde, removing a major portion of the unreacted ammonium chloride, and then treating the aqueous solution with carbon bisulphide and sodium hydroxide.

Signed at Perth Amboy, in the county of Middlesex and State of New Jersey this 25 day of May, A. D. 1926.

ADRIEN CAMBRON.